United States Patent Office 3,663,527
Patented May 16, 1972

---

3,663,527
QUATERNARY PYRIDINIUMAZOLEAZO DYESTUFFS
Gert Hegar, Schonenbuch, Switzerland, assignor to Ciba Limited, Basel, Switzerland
No Drawing. Filed Feb. 25, 1969, Ser. No. 802,227
Claims priority, application Switzerland, Mar. 1, 1968, 3,081/68
Int. Cl. C09b *29/06, 29/08, 29/22*
U.S. Cl. 260—156                    12 Claims

ABSTRACT OF THE DISCLOSURE

Azo dyestuffs of the formula

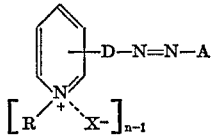

in which A represents the residue of a coupling component free from sulphonic acid and carboxylic acid groups, D represents the residue of a five-membered heterocyclic ring which contains the pyridine residue bound directly to a carbon atom of the ring, R represents an alkyl, aralkyl or cycloalkyl residue, X represents an anion and $n$ stands for 1 or 2. The dyestuffs are suitable for dyeing and printing synthetic fibres, which produce intense and level dyeings and printings possessing good fastness properties such as good fastness to light, washing, perspiration and sublimation, and which display good stability in a wide pH range.

---

This invention provides new azo dyestuffs free from acidic groups imparting solubility in water, especially sulphonic acid and carboxyl groups, which contain at least one pyridine ring bound through one of its carbon atoms directly to the carbon atom of the residue of a heterocyclic diazo component, or the corresponding dyestuffs quaternated at the nitrogen atom of the pyridine ring. It provides, in particular, dyestuffs of the formula

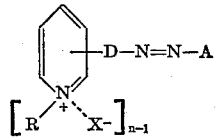

in which A represents the residue of a coupling component free from sulphonic acid and carboxylic acid groups, D represents the residue of a five-membered heterocyclic ring which contains the pyridine residue bound directly to a carbon atom of the ring, R represents an alkyl, aralkyl or cycloalkyl residue, X represents an anion and $n$ stands for 1 or 2. The residue D preferably contains a nitrogen atom and at least one other hetero atom.

A more particularly represents a coupling component of the benzene or naphthalene series free from sulfonic acid and carboxylic acid groups, D is a thiazole, thiadiazole or triazole radical and R is lower alkyl, benzyl or cyclohexyl. Further in the above Formula D represents a 1,2,4-thiadiazole radical bound to the pyridine ring in 3-position and to the azo group in 5-position, or a 1,3,4-thiadiazole radical bound to the pyridine ring in 2-position and to the azo group in 5-position, or a 1,2,4-triazole-radical bound to the pyridine ring in 3-position and to the azo group in 5-position.

In accordance with the invention, the new dyestuffs may be manufactured by coupling or quaternation.

Manufacture by coupling is effected by coupling a diazotized heterocyclic amine which contains a pyridine ring which may be quaternated and is bound directly to a carbon atom, preferably a diazotized amine of the formula

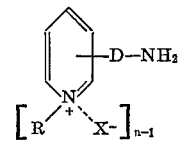

in which D, R, X and $n$ have the meanings given above, with any desired coupling component that is free from sulphonic acid and carboxyl groups.

Manufacture by quaternation is effected by treating the corresponding dyestuffs which contain a non-quaternated pyridine residue with quaternating agents, for example, dyestuffs of Formula 1, in which $n$ stands for 1 and A and D have the meanings given above, are reacted with compounds of the formula RX, in which X and R have the meanings given above.

The amines used as starting materials in the manufacture of the new azo dyestuffs by coupling are also new and form part of the invention. They may be prepared by methods known per se, especially by ring formation and, if desired, subsequent quaternation. Pyridine-2-, -3- or -4-carboxylic acid derivatives, which may be formed intermediately during the reaction, and which are capable of forming a heterocyclic ring, especially a five-membered ring are converted into the corresponding heterocycles by cleavage of a multiple bond by elimination, for example, of water (condensation) or ammonia. For example, a pyridine-carboxylic acid amidine may be reacted with thiocyanogen or a pyridinecarboxylic acid halogenoamidine may be reacted with a thiocyanate via the intermediate formation of a pyridine carboxylic acid thiocyanmidine to form a 1,2,4-thiadiazole derivative, in accordance with the following reaction pattern (cf. German patent specification No. 842,346):

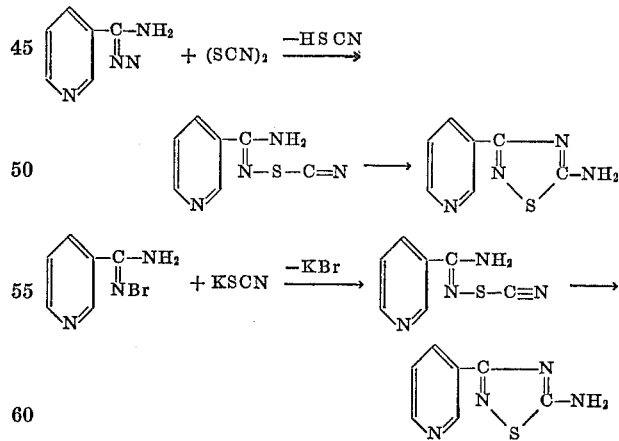

or a pyridine carboxylic acid imidoether or a pyridine carboxylic acid halide may be reacted with thiosemicarbazide via the intermediate formation of a pyridine carboxylic acid thiosemicarbazide or a pyridine carboxylic acid imidothiosemicarbazide respectively to form the 1,3,4-thiadiazole derivative, in accordance with the following reaction pattern (cf. German patent specification No. 1,067,440; Hoggarth, J. Chem. Soc. 1949, 1163):

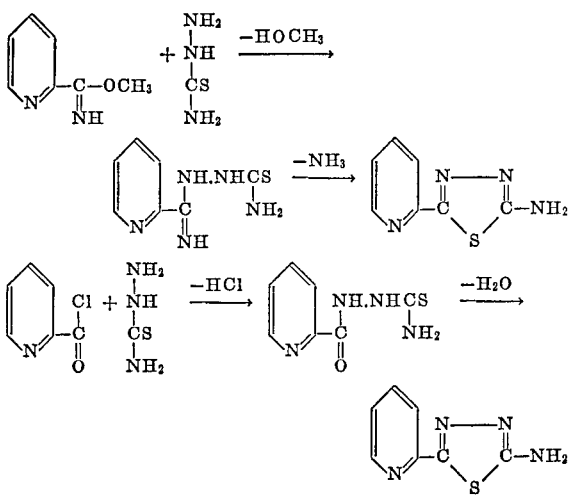

The principal examples of such diazo components are aminothiazoles, aminothiadiazoles and aminotriazoles, for example, the following: 5-amino-3-(2'-, 3'- or 4'-pyridyl)-1,2,4-thiadiazole, 2-amino-5-(2'-, 3'- or 4'-pyridyl)-1,3,4-thiadiazole and 3-amino-5-(2'-, 3'- or 4'-pyridyl)-1,2,4-triazole.

Any desired coupling component may be used, for example, a coupling component of the benzene, naphthalene or heterocyclic series. Coupling components of the benzene series that may be mentioned in addition to the phenols, for example, para-cresol, are, in particular, the aminobenzenes for example, aniline,
3-methylaniline,
2-methoxy-5-methylaniline,
3-acetylamino-1-aminobenzene,
N-methylaniline,
N-β-hydroxyethylaniline,
N-β-methoxyethylaniline,
N-β-cyanoethylaniline,
N-β-chloroethylaniline,
dimethylaniline,
diethylaniline,
N-methyl-N-benzylaniline,
N-n-butyl-N-β-chloroethylaniline,
N-methyl-N-β-cyanoethylaniline,
N-methyl-N-β-hydroxyethylaniline,
N-ethyl-N-β-chloroethylaniline,
N-methyl-N-β-acetoxyethylaniline,
N-ethyl-N-β-methoxyethylaniline,
N-β-cyanoethyl-N-β-chloroethylaniline,
N-cyanoethyl-N-acetoxyethylaniline,
N,N-di-α-hydroxyethylaniline,
N,N-di-β-acetoxyethylaniline,
N-ethyl-N-2-hydroxy-3-chloropropylaniline,
N,N-di-β-cyanoethylaniline,
N,N-di-β-cyanoethyl-3-methylaniline,
N-β'-cyanoethyl-N-β''-hydroxyethyl-3-chloroaniline,
N,N-di-β-cyanoethyl-3-methoxyaniline,
N,N-dimethyl-3-acetylaminoaniline,
N-ethyl-N-β-cyanoethyl-3-acetylaminoaniline,
N,N-di-β-cyanoethyl-2-methoxy-5-acetylaminoaniline,
N-methyl-N-phenacylaniline,
N-β-cyanoethyl-2-chloroaniline,
N,N-diethyl-3-trifluoromethylaniline,
N-ethyl-N-phenylaniline,
diphenylamine,
N-methyldiphenylamine,
N-methyl-4-ethoxydiphenylamine or
N-phenylmorpholine.

These compounds may be represented as follows:

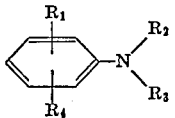

wherein $R_1$ is hydrogen, $C_{1-2}$ alkyl, methoxy, chloro or $CF_3$, $R_2$ is hydrogen, $C_{1-2}$ alkyl, hydroxyethyl, methoxyethyl, cyanoethoxyethyl, cyanoethyl, chloroethyl, benzyl, acetoxyethyl, 2-hydroxy-3-chloropropyl, phenyl, ethoxyphenyl, (pyridiniumchloride)ethyl, (pyridiniumbromide)ethyl or (trimethylammoniumchloride)ethyl, $R_3$ is hydrogen, $C_{1-6}$ alkyl, methoxyethyl, cyanoethyl, hydroxyethyl, acetoxyethyl or benzyl, $R_2$ and $R_3$ together morpholino or piperidino, and $R_4$ is hydrogen, $C_{1-2}$ alkyl or methoxy, and also, for example, amines of the formula

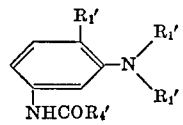

in which

represents a hydrogen atom or an alkyl or $C_{1-2}$ alkoxy group,

represents a cyanoalkoxyalkyl group,

represents a hydrogen atom, a cyanoalkoxyalkyl group or an acyloxyalkyl group and $R'_4$ represents a hydrogen atom, an alkyl, cycloalkyl or alkoxy group that may be substituted or a benzene residue, and especially those of the formula

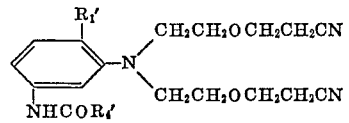

in which

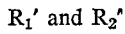

have the meanings given above.

Specially valuable results may also be obtained with coupling components of the formulae

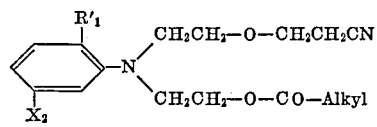

and

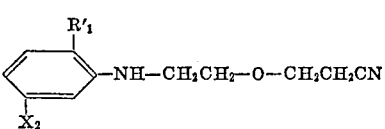

in which

has the meaning given above $X_2$ represents an acylamino group, and in which "alkyl" represents, for example, a methyl, ethyl or propyl group.

The following coupling components are given as examples:

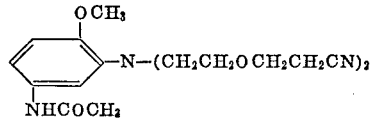

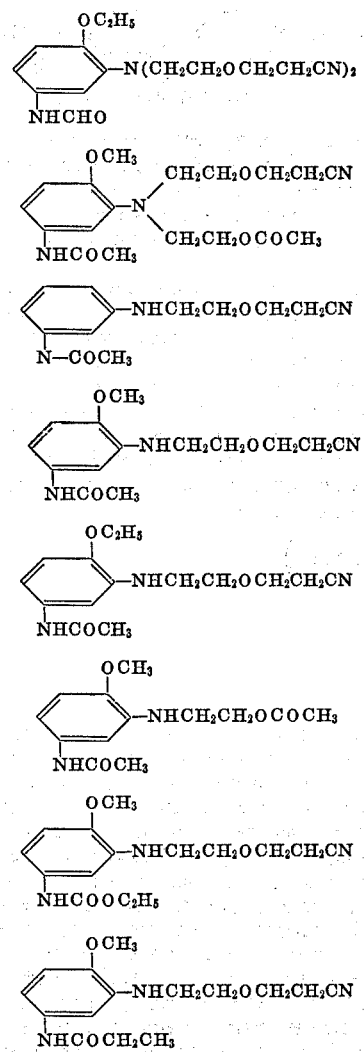

Coupling components of the naphthalene series that may be mentioned in addition to the naphthols are aminonaphthylenes and N-lower alkylated, N-benzylated or N-phenylated aminonaphthylenes, for example, 1- or 2-naphthylamine, 2-phenylaminonaphthalene, 1-dimethylaminonaphthalene and 2-ethylaminonaphthalene. Heterocyclic-coupling components are, for example, the indoles, for example, 2-methylindole,
2,5-dimethylindole,
2,4-dimethyl-7-methoxyindole,
2-phenyl- or 2-methyl-5-ethoxyindole,
2-methyl-5- or -6-chloroindole,
1,2-dimethylindole,
1-methyl-2-phenylindole,
2-methyl-5-nitroindole,
2-mehtyl-5-cyanoindole,
2-methyl-7-chloroindole,
2-methyl-5-fluoro- or 5-bromoindole,
2-methyl-5,7-dichloroindole,
2-phenylindole and
1-cyanoethyl-2,6-dimethylindole, and also pyrazoles, for example, 1-phenyl-5-aminopyrazole,
3-methylpyrazolone-5,
1-phenyl-3-methylpyrazolone-5,
1,3-dimethylpyrazolone-5,
1-butyl-3-methylpyrazolone-5,
1-hydroxyethyl-3-methylpyrazolone-5,
1-cyanoethyl-3-methylpyrazolone-5, 1-(ortho-chlorophenyl)-3-methylpyrazolone-5 and 3-carbomethoxypyrazolone-5;

quinolines, for example, 1-methyl-4-hydroxyquinoline-2,
N-ethyl-3-hydroxy-7-methyl-1,2,3,4-tetrahydroquinoline;

pyrimidines, for example, barbituric acid, and also 1,3-indanedione, 1,8-naphthindanedione or dimedone.

Coupling components that are also suitable are those containing a quaternatable or quaternated group, for example, N-methyl-N,2-dimethylaminoethylaniline, N,2-(N'-ethyl-N'-phenyl)aminoethylpyridinium chloride, and also compounds of the formulae

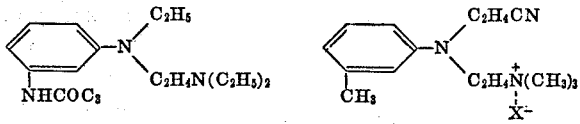

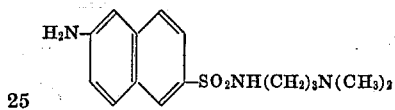

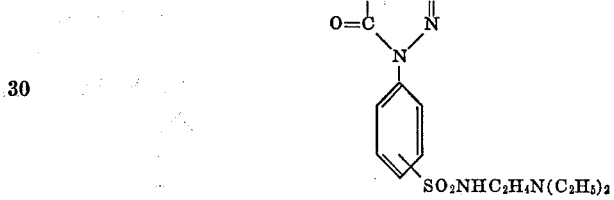

Compounds that may also be used as coupling components are diazotizable amines, for example, 1-amino-3-methylbenzene, 1-amino-2-methoxy-5-methylbenzene, 1-aminonaphthalene and so forth. Aminoazo dyestuffs are thus formed that may be diazotized and then coupled with the above-mentioned coupling components to form disazo or polyazo dyestuffs.

Also suitable are bifunctional coupling components, for example, those corresponding to the formulae

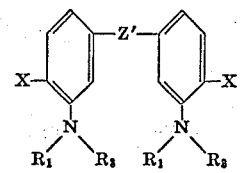

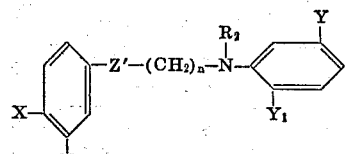

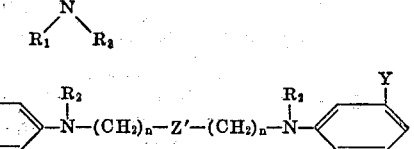

in which X, Y and $Y_1$ each represents a hydrogen atom, a trifluoromethyl, alkanesulphonyl, alkyl, alkoxy, aryloxy or arylthio group, a halogen atom or an acylamino group, $R_1$, $R_2$ and $R_3$ each represents a hydrogen atom, an alkyl or a substituted alkyl group, $n$ stands for 1, 2 or 3 and $Z'$ represents a bridging group of the formula

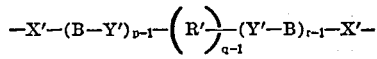

in which B represent a CO, SO$_2$ or a low alkylene bridge, X' and Y' each represents an oxygen or a sulphur atom or a nitrogen bridge, especially an NH-bridge, or a direct bond, and in which the two symbols X', the two symbols Y' and B may be different from one another, R' represents a substituted or unsubstituted heterocyclic, aromatic or aliphatic residue, which aliphatic residue may be interrupted by hetero atoms, and $p$, $q$ and $r$ each stands for 1 or 2, but the sum of $p+q+r$ must be not less than 4. The following are given as examples of such coupling components which may be coupled on each side with a diazotized amine:

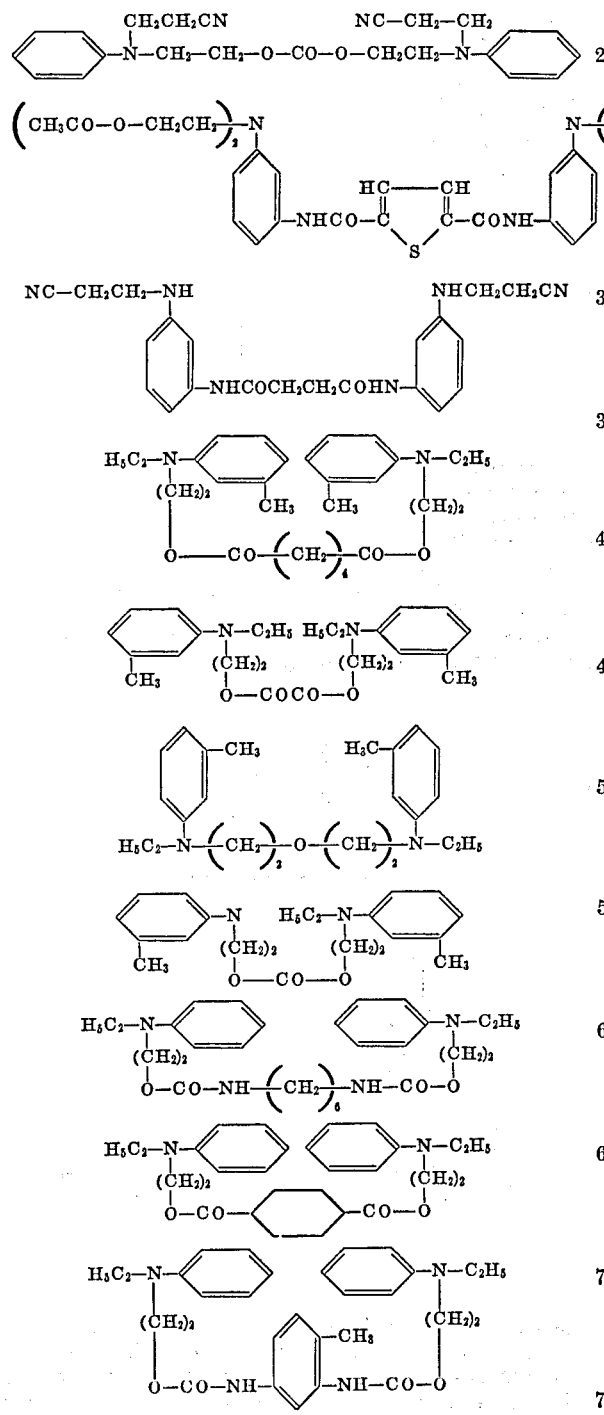

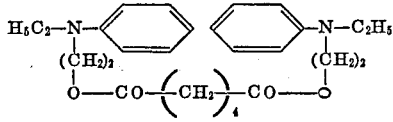

The single diazo component may also be replaced by a mixture of two or more of the diazo components in accordance with the invention, and the single coupling component may be replaced by a mixture of two or more of the coupling components in accordance with the invention.

Diazotization of the above-mentioned diazo components may be carried out by known methods, for example, with a mineral acid, especially hydrochloric acid, and sodium nitrite, or, for example, with a solution of nitrosylsulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, pyridine or a salt thereof.

Those new dyestuffs that contain a quaternated pyridinium group may be obtained according to a second variant of the manufacturing process in that the corresponding dyestuffs that contain a non-quaternated pyridine residue are quaternated by treatment with an alkylating agent.

The following are examples of alkylating or quaternating agents: esters of strong mineral acids or organic sulphonic acids, for example, dimethyl sulphate and diethyl sulphate, alkyl halides, for example, methyl chloride, methyl bromide or methyl iodide, aralkyl halides, for example, benzyl chloride, esters of low-molecular-weight alkane-sulphonic acids, for example, methyl esters of methane-, ethane- or butane-sulphonic acid and esters of benzene sulphonic acids which may contain additional substituents, for example, methyl-, ethyl-, propyl- or butyl-esters of benzene sulphonic acid, 2- or 4-methylbenzene sulphonic acid, 4-chlorobenzene sulphonic acid or 3- or 4-nitrobenzene sulphonic acid.

It is expedient to effect alkylation by heating in an inert organic solvent, for example, a hydrocarbon, for example, benzene, toluene or xylene, a halogenated hydrocarbon, for example, carbon tetrachloride, tetrachloroethane, chlorobenzene or ortho-dichlorobenzene, or a nitrohydrocarbon, for example, nitromethane, nitrobenzene or a nitronaphthalene. Anhydrides, acid amides or nitriles may also be used as solvents in the alkylation process, for example, acetic anhydride, dimethylformamide or acetonitrile; dimethylsulphoxide may also be used as solvent. Use may also be made of a large excess of alkylating agent instead of a solvent. In this case, care must be taken to ensure that the mixture does not become unduly heated, because the reaction is highly exothermic. However, in most cases it is generally necessary to apply external heat to the reaction mixture to initiate the reaction, particularly when working in the presence of an organic solvent. In special cases, alkylation may also be carried out in an aqueous medium or with the use of an alcohol, if necessary, in the presence of a small amount of potassium iodide.

The dyestuff salts may be purified, if necessary, by dissolving them in water, any unreacted starting dyestuff being filtered off as an insoluble residue. The dyestuff may be precipitated from the aqueous solution by the addition of a water-soluble salt, for example, sodium chloride.

The quaternated dyestuffs obtained by the process of the invention preferably contain as anion the residue of a strong acid, for example, sulphuric acid, or a semi-ester thereof, or the residue of an arylsulphonic acid or a halogen ion. The said anions, which are introduced into the dyestuff molecule in accordance with the invention, may also be replaced by anions of other inorganic acids, for example, phosphoric or sulphuric acid, or by anions of organic acids, for example, formic, lactic or tartaric acid; in some cases it is also possible to use the free bases. The dyestuff salts may also be used in the form of double salts, for example, with halides of elements of Group II of the Periodic Table, especially zinc chloride or cadmium chloride.

However, the quaternated dyestuffs obtained by the process of the invention preferably contain as anion —Cl, —Br, —I, =$SO_4$, —$SO_3$-alkyl, —$SO_3$-aryl or $SO_3$—O-alkyl.

The dyestuffs or dyestuff salts containing a quaternated pyridine residue obtained by the process of the present invention are suitable for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres, but especially polyacrylonitrile fibres or polyvinylidene cyanide fibres (Darvan). By polyacrylonitrile fibres is meant principally polymers containing more than 80 percent of acrylonitrile, for example, 80 to 95 percent; they may also contain 5 to 20 percent of vinyl acetate, vinyl pyridine, vinyl chloride, vinylidene chloride, acrylic acid, acrylic acid ester, methacrylic acid, methacrylic acid esters, and so forth. These products are sold under the following trade names: "Acrilan 1656" (Chemstrand Corporation, Decatur, Ala., U.S.A.), "Acrilan 41" (Chemstrand Corporation), "Creslan" (American Cyanamid Company), "Orlon 44" (Du Pont), "Crylor HH" (Soc, Rhodiacéta SA, France), "Leacril N" (Applicazioni Chimice Società per Azioni, Italy), "Dynel" (Union Carbide Chem. Corp.), "Exlan" (Japanese Exlan Industry Co., Japan), "Vonnel" (Mitsubishi, Japan), "Verel" (Tennessee Eastman, U.S.A.), "Zefran" (Dow Chemicals, U.S.A.), "Wolcrylon" (Filmfabrik Agfa, Wolfen), "Ssaniw" (U.S.S.R.), and also "Orlon 42," "Dralon," "Courtelle," and so forth.

The new dyestuffs produce on these fibres, which may also be dyed in admixture with one another, intense and level dyeings possessing good fastness to light and good properties of general fastness, especially good fastness to washing, perspiration, sublimation, crease-resist finishing, decatizing, hot-pressing, rubbing, carbonizing, water, sea water, dry cleaning, cross-dyeing and solvents. The new dyestuffs of the invention also display, inter alia, good stability in a wide pH range, good affinity in aqueous solutions having different pH values, and good fastness to kier-boiling. Furthermore, the new dyestuffs reserve well on wool and other natural polyamide fibres.

The quaternated, water-soluble dyestuffs generally have little sensitivity to electrolytes, and some of them display exceptionally good solubility in water or polar solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercial levelling agents have no deleterious effect if used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which contains, for example, the usual printing adjuvants in addition to the dyestuff. The dyestuffs may also be used for the bulk colouration of acrylonitrile polymerization products and other plastic materials, which may be dissolved, the colourations produced being fast to light and washing. They are also suitable for colouring oil paints and lacquers, and for dyeing cotton, especially mordanted cotton, cellulose, regenerated cellulose and paper.

The new dyestuffs manufactured by the process of the invention which are insoluble in water and which contain a pyridine residue having a tertiary nitrogen atom are advantageously used in a finely divided form and in the presence of a dispersing agent, for example, soap, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by precipitating the dyestuff from sulphuric acid and grinding the suspension so obtained wtih sulphite cellulose waste liquor. They may also be prepared, if desired, by grinding the dyestuff in a highly efficient grinding device in the dry or wet state in the presence or absence of a dispersing agent. These dyestuffs are also suitable for dyeing and printing a very wide variety of man-made fibres, for example, cellulose acetate fibres and polyolefine fibres, for example, modified polypropylene, polyacrylonitrile, polyvinyl chloride, polyamide or polyurethane fibres, but especially fibres made from polyesters of aromatic dicarboxylic acids, for example, polyethylene terephthalate fibres.

To obtain stronger dyeings, for example, on polyethylene terephthalate fibres, it is advantageous to add a swelling agent to the dyebath, or to carry out the dyeing process under superatmospheric pressure at a temperature of above 100° C., for example, at 120° C. Suitable swelling agents are aromatic carboxylic acids, for example, benzoic acid or salicylic acid, phenols, for example, ortho, or para-hydroxydiphenyl, aromatic halogenated compounds, for example, chlorobenzene, ortho-dichlorobenzene or trichlorobenzene, phenylmethylcarbinol or diphenyl. When carrying out the dyeing process under superatmospheric pressure it is generally advantageous to render the dyebath slightly acid, for example, by the addition of a weak acid, for example, acetic acid.

The new dyestuffs containing a non-quaternated pyridine residue are specially suitable for application by the so-called thermofixation process in which the fabric to be dyed is impregnated preferably at a temperature not exceeding 60° C. with an aqueous dispersion of the dyestuff which advantageously contains 1 to 50 percent of urea and a thickening agent, especially sodium alginate and squeezed in the usual manner. The fabric is advantageously squeezed so as to retain 50 to 100 percent of its dry weight of dye-liquor.

To fix the dyestuff, the fabric so impregnated is heated to a temperature above 100° C., for example, to a temperature between 180 and 220° C., preferably after drying, for example, in a current of warm air.

The above-mentioned thermofixation process is specially suitable for dyeing union fabrics made from polyester fibres and cellulosic fibres, especially cotton. In this case, the padding liquor contains, in addition to the dyestuff to be used in accordance with the invention, dyestuffs which are suitable for dyeing cotton, for example, direct dyestuffs or vat dyestuffs, or especially the so-called reactive dyestuffs, that is to say, dyestuffs that can be fixed on the cellulosic fibre with formation of a chemical bond, for example, dyestuffs which contain a chlorotriazine or a chlorodiazine residue. In the latter case, it is advantageous to add an agent capable of binding acid to the padding solution, for example, an alkali metal carbonate or an alkali metal phosphate or an alkali metal borate or perborate, or a mixture thereof. When using vat dyestuffs, the padded fabric has to be treated after the heat treatment with an aqueous alkaline solution of one of the reducing agents commonly used in vat dyeing.

The dyeings produced on polyester fibres by the said processes are advantageously subjected to an after-treatment, for example, by heating with an aqueous solution of a non-ionic detergent.

The said dyestuffs are also suitable for dyeing union fabrics made from polyester fibre and wool; the wool portion of the fabric is reserved and can subsequently be dyed with a wool dyestuff.

The dyestuffs may also be applied by printing processes. In this method of application a printing paste, for example, is used which contains the finely dispersed dyestuff, if necessary, in admixture with one of the above-mentioned cotton dyestuffs, as well as the adjuvants normally used in printing, for example, wetting and thickening agents, if necessary, in the presence of urea and/or an agent capable of binding acid.

The above-described processes produce strong dyeings and prints possessing excellent properties of fastness, especially good fastness to light, sublimation, decatizing, washing and chlorinated water. A further advantage of the new dyestuffs is that they reserve well on wool and cotton, are stable during drying and show little tendency to deteriorate during prolonged boiling in the presence of wool.

The following examples illustrate the invention, the parts and percentages being by weight unless otherwise stated.

EXAMPLE 1

A mixture is prepared comprising 85 parts by volume of N nitrosylsulphuric acid and 90 parts by volume of a mixture of propionic acid and glacial acetic acid (ratio 1:6). A solution of 14.25 parts of 5-amino-3-(3'-pyridyl)-1,2,4-thiadiazole in 90 parts of the above-mentioned mixture of propionic acid and glacial acetic acid is added at 0 to 5° C. and the batch is stirred for 4 hours in an ice bath. 3 parts of urea are added, the batch is stirred for a further hour and then the diazo solution is run into a solution of 12.8 parts of N-methyl-N,2-cyanoethylaniline in 200 parts of glacial acetic acid. 800 parts of ice-water are added and the free mineral acid is neutralized by the addition of sodium acetate to a pH value of 4. A further 800 parts of water are added, the batch is heated to 50° C., and the dyestuff of the formula

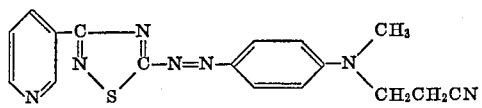

which precipitates almost completely, is isolated by filtration. It dyes polyester fibres a fast scarlet shade when applied in the form of an aqueous dispersion.

Dyestuffs having similar properties may be obtained by replacing the 5-amino-3-(3'-pyridyl)-1,2,4-thiadiazole with 5-amino-3-(2'-pyridyl)-1,2,4-thiadiazole or 5-amino-3-(4'-pyridyl)-1,2,4-thiadiazole.

Further dyestuffs that dye polester fibres the shades listed in column III of the following table may be obtained by following the procedure described in the above example, but replacing the N-methyl-N,2-cyanoethylaniline with the coupling components listed in column II.

| I | II | III |
|---|---|---|
| 1 | 2-methylindole | Yellow. |
| 2 | Diphenylamine | Red. |
| 3 | 2-naphthylamine | Red. |
| 4 | Dimethylamine | Violet. |
| 5 | N,N-biscyanoethyl-1,3-toluidine | Scarlet. |
| 6 | N,N-biscyanoethylaniline | Do. |

Preparation of 5-amino-3-(3'-pyridyl)-1,2,4-thiadiazole

A sodium hypobromite solution prepared from 170 parts by volume of 30% sodium hydroxide solution, 270 parts of water and 134 parts of bromine is added at 0 to 5° C. to a solution of 120 parts of the amidine hydrochloride of the formula

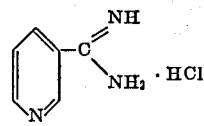

(prepared according to the method described by Shaefer and Peters, J. Org. Chem. 26, 412 [1961]) in 600 parts of water. The N-bromoamidine which precipitates is isolated by suction filtration, washed with water and dried at 40° C. It is dissolved in 250 parts of methanol and then a solution of 60 parts of sodium thiocyanate in 185 parts of methanol is added at a temperature below 20° C. The crystal slurry which forms is heated to about 50° C., is allowed to cool to room temperature and is then filtered and dried.

The corresponding 5-amino-3-(2'-pyridyl)-1,2,4-thiadiazole may be obtained in an analogous manner from pyridine-2-carbonamidine, and the corresponding 5-amino-3-(4'-pyridyl)-1,2,4-thiadiazole may be obtained from pyridine-4-carbonamidine.

EXAMPLE 2

3.56 parts of 2-amino-5-(2'-pyridyl)-1,3,4-thiadiazole are dissolved in 20 parts of a mixture of propionic acid and glacial acetic acid (ratio 1:6), and the solution so obtained is added dropwise at 0° C., while stirring, to a mixture of 22 parts by volume of N nitrosylsulphuric acid and 20 parts of the above-mentioned mixture of propionic acid and glacial acetic acid. The batch is stirred for 3 hours at 0 to 5° C., 2 parts of urea are added and, after a further 30 minutes, a solution of 3.2 parts of N-methyl-N,2-cyanoethylaniline in 20 parts of glacial acetic acid is added. The solution so obtained is discharged into 800 parts of ice-water and the pH of the violet solution is adjusted to 3 to 4 by the addition of 100 parts of sodium acetate crystals. The dyestuff of the formula

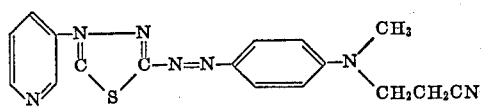

which precipitates is isolated by suction filtration, washed with water and dried. It dyes polyester fibres a fast red shade when applied in the form of an aqueous dispersion.

Preparation of 2-amino-5-(2'-pyridyl)-1,3,4-thiadiazole 27.2 parts of pyridine-2-carboxylic acid imidomethylether [prepared according to the method described by Shaefer and Peters, J. Org. Chem. 26, 412 (1961)] are dissolved in 150 parts of pyridine and then 28 parts of thiosemicarbazide hydrochloride are added. The batch is heated for 3 hours at 110° C. while stirring, the solution is filtered while still warm, and 100 parts of pyridine in the filtrate are evaporated in vacuo. 200 parts of cold water are added to the residue, and the 2-amino-5-(2'-pyridyl)-1,3,4-thiadiazole which precipitates after some time in the form of crystals is isolated by suction filtration and dried.

EXAMPLE 3

16.1 parts of 3-amino-5-(3'-pyridyl)-1,2,4-triazole are dissolved in 100 parts of 4 N hydrochloric acid and diazotized at 0° C. by the addition of 25 parts by volume of a 4 N sodium nitrite solution in water. A solution of 15 parts of N,N-diethylaniline in 100 parts of N hydrochloric acid is added to the diazo solution and the coupling mixture is rendered neutral to Congo paper by the addition of sodium acetate. The dyestuff which precipitates is isolated by suction filtration, washed with water and dried. It dyes polyester fibres a fast orange shade.

The 3-amino-5-(3'-pyridyl)-1,2,4-triazole is obtained from nicotinylaminoguanidine (prepared by reacting nicotinic acid hydrazide with S-methylisothiourea or by reacting nicotinic acid chloride with aminoguanidine) by splitting off water by heating to 260 to 270° C. Colourless crystals melting at 235 to 236° C. are formed.

Further dyestuffs which dye polyester fibres the shades listed in column IV of the following table may be obtained by the processes described in Examples 1 to 3 by diazotizing the diazo components listed in column II and coupling them with the coupling components listed in column III.

| I | II | III | IV |
|---|---|---|---|
| 1 | 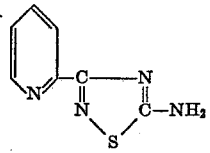 | 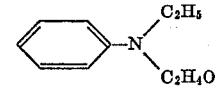 | Ruby. |
| 2 | Same as above |  | Violet. |
| 3 | do | 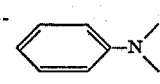 | Red. |
| 4 | do | 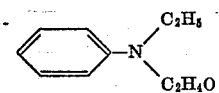 | Ruby. |
| 5 | do | 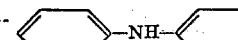 | Violet |
| 6 | do | 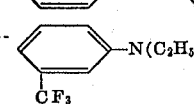 | Red. |
| 7 | do | 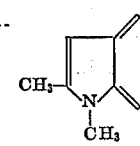 | Yellow. |
| 8 | do | 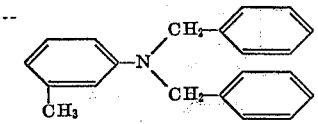 | Red. |
| 9 | do | 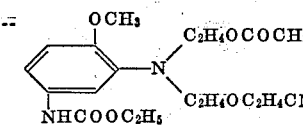 | Violet. |
| 10 | do | 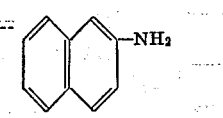 | Red. |
| 11 | do | 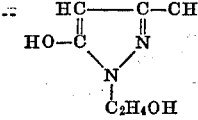 | Yellow. |
| 12 | 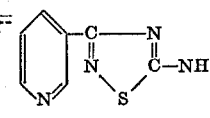 | 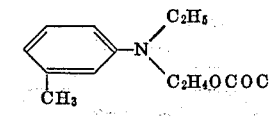 | Ruby. |
| 13 | do | 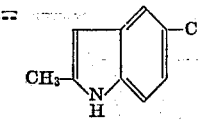 | Yellow. |
| 14 | do | 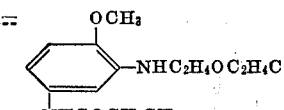 | Violet. |

TABLE—Continued
| I | II | III | IV |
|---|---|---|---|
| 15 | do | 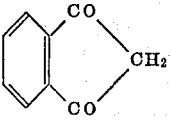 | Yellow. |
| 16 | do | 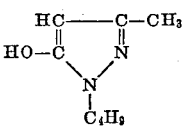 | Do. |
| 17 | do | 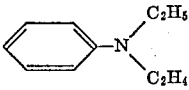 | Scarlet. |
| 18 | 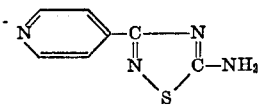 | 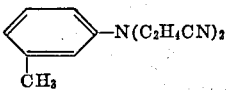 | Do. |
| 19 | do | 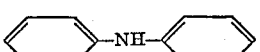 | Violet. |
| 20 | do | 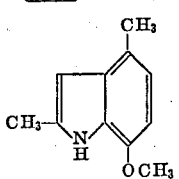 | Orange. |
| 21 | 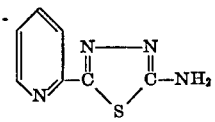 | 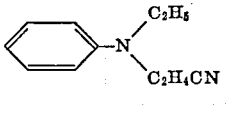 | Red. |
| 22 | do | 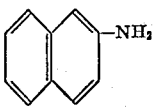 | Violet. |
| 23 | do | 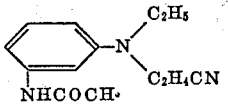 | Ruby. |
| 24 | do | 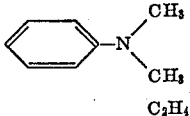 | Violet. |
| 25 | do | 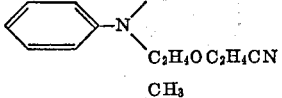 | Red. |
| 26 | 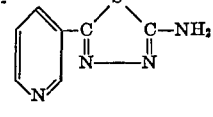 | 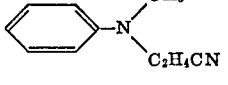 | Red. |
| 27 | do | 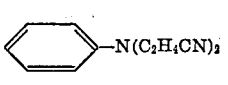 | Scarlet. |
| 28 | do | 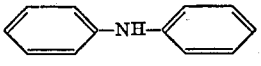 | Violet. |
| 29 | do | 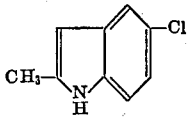 | Yellow. |
| 30 | do | 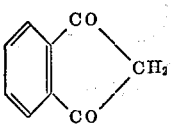 | Do. |

| I | II | III | IV |
|---|---|---|---|
| 31 | do | (structure: phenyl-N with HO-C=CH, N=C-CH₃ pyrazolone) | Do. |
| 32 | (pyridyl-thiadiazole-NH₂) | (phenyl-N(C₂H₅)(C₂H₄CN), CH₃) | Red. |
| 33 | do | (naphthyl-NH₂) | Violet. |
| 34 | do | (phenyl-N(CH₂CH₂)₂O morpholine) | Ruby. |
| 35 | do | (phenyl-N(C₂H₄CN)(C₂H₄O-CO-O-C₂H₄)N(C₂H₄CN)-phenyl) | Red. |
| 36 | (pyridyl-triazole-NH₂) | (phenyl-N(CH₃)(C₂H₄CN)) | Yellow. |
| 37 | do | (naphthyl-NH₂) | Red. |
| 38 | do | (naphthyl-OH) | Orange. |
| 39 | do | (HC=C-CH₃, HO-C, N-NH pyrazolone) | Greenish yellow. |
| 40 | do | (phenyl-NH₂, NHCOCH₃) | Orange. |
| 41 | do | (phenyl-N(C₂H₅)(C₂H₄Cl)) | Yellow. |
| 42 | do | (phenyl-N(CH₃)₂) | Orange. |
| 43 | do | (phenyl-N(CH₃)(C₂H₄OH), CF₃) | Yellow. |
| 44 | (pyridyl-triazole-NH₂) | (OCH₃, NHC₂H₄OC₂H₄CN, NHCOCH₃ phenyl) | Red. |
| 45 | do | (HC=C-CH₃, HO-C, N-C₄H₉ pyrazolone) | Yellow. |

| I | II | III | IV |
|---|---|---|---|
| 46 | do | [phenyl-N(C₂H₅)(C₂H₄OCO—(CH₂)₂—)]₂ | Do. |
| 47 | pyridyl-thiadiazole-C-NH₂ (3-pyridyl, 1,2,4-thiadiazole, 5-NH₂) | 3-methylcyclohexyl-N(C₂H₅)(C₂H₄CN) | Red. |
| 48 | pyridyl-thiadiazole-C-NH₂ (4-pyridyl isomer) | Same as above | Red. |

EXAMPLE 4

8.9 parts of 5-amino-3-(3′-pyridyl)-1,2,4-thiadiazole are diazotized as described in Example 1, and the diazo solution is run into a solution of 14.5 parts of N,2-(N′-phenyl-N′-butyl)-aminoethylpyridinium chloride in 100 parts of water and 100 parts of ice. The batch is diluted with 1,000 parts of water, rendered neutral to Congo red by the addition of 250 parts of sodium acetate crystals, and the dyestuff is precipitated by the addition of a solution of 20 grams of zinc chloride in 100 parts by volume of a 30% sodium chloride solution. It dyes polyacrylonitrile fibres a fast brilliant red shade.

The following table lists in column II further cationic dyestuffs that dye polyacrylonitrile fibres the shades indicated in column III and that may be obtained by coupling in accordance with the procedures described in Examples 1 to 4.

| I | II | III |
|---|---|---|
| 1 | 3-pyridyl-1,2,4-thiadiazol-5-yl—N=N—(2-methylphenyl)—N(C₂H₅)(C₂H₄—N⁺-pyridinium) Cl⁻ | Bluish red. |
| 2 | 3-pyridyl-1,2,4-thiadiazol-5-yl—N=N—phenyl—N(C₆H₁₃)(C₂H₄—N⁺-pyridinium) Cl⁻ | Red. |
| 3 | 2-pyridyl-1,3,4-thiadiazol-5-yl—N=N—(3-NHCOCH₃-phenyl)—N(C₂H₅)(C₂H₄—N⁺(CH₃)₂H) Cl⁻ | Ruby. |
| 4 | 3-pyridyl-1,2,4-thiadiazol-5-yl—N=N—C(—C—CH₃)=... pyrazolone (HO-C, N), N-phenyl-SO₂NH—C₂H₄N⁺(CH₃)₃ Br⁻ | Yellow. |
| 5 | 3-pyridyl-1,2,4-triazol-5-yl (NH)—N=N—phenyl—N(C₄H₉)(C₂H₄—N⁺-pyridinium) Br⁻ | Reddish yellow. |
| 6 | 3-pyridyl-1,2,4-thiadiazol-5-yl—N=N—(2-OCH₃, 5-NHCOCH₃-phenyl)—N(CH₃)(C₂H₄—N⁺-pyridinium) Cl⁻ | Violet. |

| I | II | III |
|---|---|---|
| 7 | 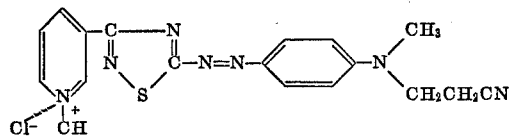 | Scarlet. |

EXAMPLE 5

3 parts of the dyestuff of Example 1, 30 parts of dimethyl formamide and 2 parts of dimethyl sulphate are stirred for one hour at 80° C., the dyestuff solution so obtained is poured into a mixture of 400 parts of water and 4 parts of glacial acetic acid, and the dyestuff of the formula

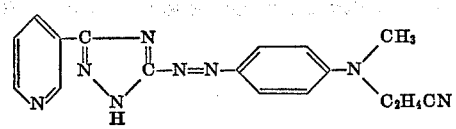

is precipitated from the clear red solution by the addition of 40 parts of sodium chloride. It dyes polyacrylonitrile fibres a bluish red shade possessing excellent fastness to light.

Dyestuffs having similar properties may be obtained by replacing the dimethyl sulphate with diethyl sulphate, benzyl chloride or para-toluene sulphonic acid butylester as quaternating agents and proceeding as described in Example 5.

EXAMPLE 6

16.6 parts of the monoazo dyestuff of the formula 100 parts of dimethylformamide and 10 parts of para-toluene-sulphonic acid methylester are stirred at 80 to 90° C. until starting material is no longer detectable in a thin-layer chromatogram carried out with a test sample. Most of the solvent is removed in vacuo and the residue is diluted with a solution of 10 grams of glacial acetic acid in 500 parts of water. 20 grams of zinc chloride and 60 parts of sodium chloride are added and the dyestuff of the formula

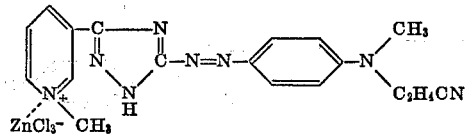

precipitates from the solution. It dyes polyacrylonitrile fibres a fast reddish yellow shade.

In the following table are listed further dyestuffs that produce fast shades on polyacrylonitrile fibres as given in column IV. They are obtained by quaternating the dyestuffs listed in column II with the alkylating agents given in column III in accordance with the procedures described in Examples 5 and 6.

| I | II | III | IV |
|---|---|---|---|
| 1 | pyridyl-thiazole-N=N-indole-CH₃ | Dimethyl sulphate | Yellow. |
| 2 | pyridyl-thiazole-N=N-phenyl-NH-phenyl | do | Violet. |
| 3 | pyridyl-thiazole-N=N-(CH₃-phenyl)-N(C₂H₄CN)₂ | Toluenesulphonic acid ethylester | Red. |
| 4 | pyridyl-thiazole-N=N-phenyl-N(C₂H₄CN)₂ | Dimethyl sulphate | Red. |
| 5 | pyridyl-thiazole(NHCOCH₃)-N=N-phenyl-N(CH₃)(C₂H₄OCOCH₃) | Diethyl sulphate | Ruby. |

TABLE—Continued

| I | II | III | IV |
|---|---|---|---|
| 6 | (pyridyl)-C(=N-N=)-S-C-N=N-C₆H₄-N(CH₃)(C₂H₄CN) | Benzenesulphonic acid methylester | Red. |
| 7 | (pyridyl)-C(=N-N=)-S-C-N=N-C₆H₃(CF₃)-N(C₂H₅)₂ | Dimethyl sulphate | Red. |
| 8 | (pyridyl)-C(=N-N=)-S-C-N=N-(2-methyl-1-methylindol-3-yl) | Benzyl chloride | Yellow. |
| 9 | (4-pyridyl)-C(=N-N=)-S-C-N=N-C₆H₄-NH-C₆H₅ | Dimethyl sulphate | Violet. |
| 10 | (4-pyridyl)-C(=N-N=)-S-C-N=N-(2,4-dimethyl-7-methoxyindol-3-yl) | ...do... | Orange. |
| 11 | (pyridyl)-C(N=N)-S-C-N=N-C₆H₄-N(C₂H₅)(C₂H₄CN) | Para-toluenesulphonic acid butylester | Red. |
| 12 | (pyridyl)-C(N=N)-S-C-N=N-C₆H₄-N(C₂H₄CN)(C₂H₄OC₂H₄CN) | Dimethyl sulphate | Red. |
| 13 | (pyridyl)-C(S-C=N-N)-N=N-(5-chloro-2-methylindol-3-yl) | Benzyl chloride | Yellow. |
| 14 | (pyridyl)-C(S-C=N-N)-N=N-C(=C(CH₃)-N(C₆H₅)-N=)-C-OH | Dimethyl sulphate | Do. |
| 15 | (pyridyl)-C(S-C(CH₃)=N-N=)-C-N=N-C₆H₄-N(C₂H₅)(C₂H₄CN) | Diethyl sulphate | Red. |
| 16 | (pyridyl)-C(=N-NH-)-C-N=N-C₆H₃(CH₃)-N(C₂H₅)(C₂H₄CN) | Dimethyl sulphate | Orange. |

| I | II | III | IV |
|---|---|---|---|
| 17 | 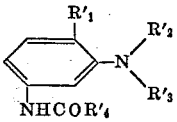 | Benzyl chloride | Yellow. |
| 18 | 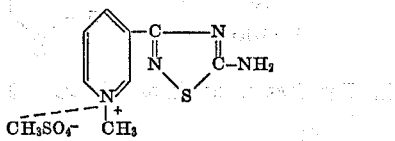 | Dimethyl sulphate | Do. |
| 19 | 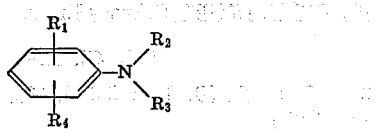 | ....do.... | Do. |

EXAMPLE 7

A mixture is prepared from 52 parts by volume of N nitrosylsulphuric acid, 42 parts of glacial acetic acid and 7 parts of propionic acid. 15.2 parts of the quaternated diazo component of the formula

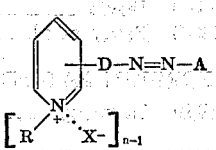

(prepared by reacting 8.9 parts of 5-amino-3-(3'-pyridyl)-1,2,4-thiadiazole with 6 parts of dimethyl sulphate in 50 parts of dimethylformamide at 50 to 60° C.) are introduced at 0 to 5° C. After stirring for one hour at the temperature indicated, the clear diazo solution is poured into a solution of 8.5 parts of N-methyl-N,2-cyanoethyl-aniline in 50 parts of 2 N hydrochloric acid and 150 parts of ice. 1,000 parts of water and 250 parts of sodium acetate crystals are added and the dyestuff is precipitated from the deep red solution by the addition of 60 parts of sodium chloride. The dyestuff so obtained is identical with the dyestuff described in Example 5.

I claim:

1. An azo dyestuff of the formula $$\left[ \begin{array}{c} \text{pyridine-D-N=N-A} \\ R \quad X^- \end{array} \right]_{n-1}$$

in which D is 1,2,4-thiadiazolyl bound to the pyridine ring in 3-position and to the azo group in 5-position, or 1,3,4-thiadiazolyl bound to the pyridine ring in 2-position and to the azo group in 5-position, or 1,2,4-triazolyl bound to the pyridine ring in 3-position and to the azo group in 5-position, R represents $C_{1-2}$-alkyl, benzyl or cyclohexyl, X represents an anion, n stands for 1 or 2 and A represents a member selected from the group consisting of a group of the formula

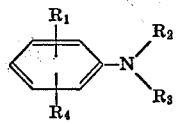

wherein $R_1$ is hydrogen, $C_{1-2}$ alkyl, methoxy, chloro or $CF_3$, $R_2$ is hydrogen, $C_{1-2}$ alkyl, hydroxyethyl, methoxyethyl, cyanoethoxyethyl, cyanoethyl, chloroethyl, benzyl, acetoxyethyl, 2-hydroxy-3-chloropropyl, phenyl, ethoxyphenyl, (pyridiniumchloride)ethyl, (pyridiniumbromide)ethyl or (trimethylammoniumchloride)ethyl, $R_3$ is hydrogen, $C_{1-6}$ alkyl, methoxyethyl, cyanoethyl, hydroxyethyl, acetoxyethyl or benzyl, $R_2$ and $R_3$ together morpholino or piperidino, and $R_4$ is hydrogen, $C_{1-2}$ alkyl or methoxy; a group of the formula $$\begin{array}{c} R'_1 \\ \diagup \\ \text{—N} \diagdown R'_2 \\ R'_3 \\ \text{NHCOR}'_4 \end{array}$$

wherein $R'_1$ is selected from the group consisting of hydrogen or $C_{1-2}$ alkoxy, $R'_2$ is $C_{1-4}$ cyanoalkoxyalkyl, $R'_3$ is selected from the group consisting of hydrogen, $C_{1-4}$ cyanoalkoxyalkyl, $C_{1-6}$ alkanoyloxyalkyl or cyanoethyl, and $R'_4$ is selected from the group consisting of hydrogen, $C_{1-2}$ alkyl, $C_{1-2}$ alkoxy and phenyl; aminonaphthyl, 2-phenylaminonaphthyl, 1-dimethylaminonaphthyl, 2-ethylaminonaphthyl, 2 - methylindolyl, 2,5 - dimethylindolyl, 2,4-dimethyl-7-methoxyindolyl, 2-phenyl- or 2-methyl-5-ethoxyindolyl, 2-methyl-5- or 6-chloroindolyl, 1,2-dimethylindolyl, 1-methyl-2-phenylindolyl, 2-methyl-5-nitroindolyl, 2 - methyl - 5-cyanoindolyl, 2-methyl-7-chloroindolyl, 2-methyl - 5 - fluoro- or -5-bromoindolyl, 2-methyl-5,7-dichloroindolyl, 2-phenylindolyl, 1-cyanoethyl-2,6-dimethylindolyl, 1-phenyl-5-aminopyrazolyl, 3-methylpyrazolonyl-5, 1-phenyl-3-methylpyrazolonyl-5, 1,3-dimethylpyrazolonyl-5, 1 - butyl - 3-methylpyrazolonyl-5, 1-hydroxyethyl-3-methylpyrazolonyl-5, 1-cyanoethyl-3-methylpyrazolonyl-5, 1 - (ortho-chlorophenyl)-3-methylpyrazolonyl-5, 3-carbomethoxypyrazolonyl - 5, 1-methyl-4-hydroxyquinolinyl-2, N - ethyl-3-hydroxy-7-methyl-1,2,3,4-tetrahydroquinolinyl, 1,3-indanedionyl, 1,8-naphthindanedionyl and dimedonyl.

2. A compound of claim 1 wherein A is a member selected from the group consisting of a group of the formula

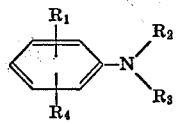

wherein $R_1$ is hydrogen, $C_{1-2}$ alkyl, methoxy, chloro or $CF_3$, $R_2$ is hydrogen, $C_{1-2}$ alkyl, hydroxyethyl, methoxyethyl, cyanoethoxyethyl, cyanoethyl, chloroethyl, benzyl, acetoxyethyl, 2-hydroxy-3-chloropropyl, phenyl, ethoxyphenl, (pyridiniumchloride)ethyl, (pyridiniumbromide) ethyl or (trimethylammoniumchloride)ethyl, $R_3$ is hydrogen, $C_{1-6}$ alkyl, methoxyethyl, cyanoethyl, hydroxyethyl, acetoxyethyl or benzyl, $R_2$ and $R_3$ together morpholino or piperidino, and $R_4$ is hydrogen, acetylamino, $C_{1-2}$ alkyl or methoxy, or a group of the formula wherein $R'_1$ is selected from the group consisting of hydrogen or $C_{1-2}$ alkoxy, $R'_2$ is $C_{1-4}$ cyanoalkoxyalkyl, $R'_3$ is selected from the group consisting of hydrogen, $C_{1-4}$ cyanoalkoxyalkyl, $C_{1-6}$ alkanoyloxyalkyl or cyanoethyl, and $R'_4$ is selected from the group consisting of hydrogen, $C_{1-2}$ alkyl, $C_{1-2}$ alkoxy or phenyl.

3. A compound of claim 1 wherein A is a member selected from the group consisting of a group of the formula wherein $R_1$ is hydrogen, $C_{1-2}$ alkyl, methoxy, chloro or $CF_3$, $R_2$ is hydrogen, $C_{1-2}$ alkyl, hydroxyethyl, methoxyethyl, cyanoethoxyethyl, cyanoethyl, chloroethyl, benzyl, acetoxyethyl, 2-hydroxy-3-chloropropyl, phenyl, ethoxyphenyl, (pyridiniumchloride)ethyl, (pyridiniumbromide) ethyl or (trimethylammoniumchloride)ethyl, $R_3$ is hydrogen, $C_{1-6}$ alkyl, methoxyethyl, cyanoethyl, hydroxyethyl, acetoxyethyl or benzyl, $R_2$ and $R_3$ together morpholino or piperidino, and $R_4$ is hydrogen, acetylamino, $C_{1-2}$ alkyl or methoxy.

4. Azo dyestuffs as claimed in claim 1 in which X in the given formula represents —Cl, —Br, —I—=$SO_4$, —$SO_3$-alkyl, —$SO_3$-aryl or $SO_3$—O-alkyl.

5. The dyestuff as claimed in claim 1 of the formula

6. The dyestuff as claimed in claim 1 of the formula

7. The dyestuff as claimed in claim 1 of the formula

8. The dyestuff as claimed in claim 1 of the formula

9. The dyestuff as claimed in claim 1 of the formula

10. The dyestuff as claimed in claim 1 of the formula

11. The dyestuff as claimed in claim 1 of the formula

12. The dyestuff as claimed in claim 1 of the formula

References Cited

UNITED STATES PATENTS

| | | | |
|---|---|---|---|
| 2,294,380 | 9/1942 | Braker | 260—156 |
| 2,857,372 | 10/1958 | Straley et al. | 260—156 X |
| 2,893,816 | 7/1959 | Tsang et al. | 260—156 X |
| 3,082,200 | 3/1963 | Moore et al. | 260—156 X |
| 3,458,305 | 7/1969 | Doyle | 260—294.8 X |
| 3,511,848 | 5/1970 | Bauer et al. | 260—296 |

FOREIGN PATENTS 1,062,245  7/1959  Germany _____ 260—296

OTHER REFERENCES

Yoshida et al.; Chem. Abstr., vol. 49, p. 10937 (1955).
Atkinson et al.; Chem. Abstr., vol. 49, pp. 15915 to 15917 (1955).
Giuliano et al.; Chem. Abstr., vol. 49, p. 14744 (1955).
Hemmerich et al.; Chem. Abstr. vol. 53, pp. 10191–10192 (1959).
Sadler, Chem. Abstr., vol. 55, p. 19919 (1961).

FLOYD D. HIGEL, Primary Examiner

U.S. Cl. X.R.

260—294.8 D, 296 R, 332.2 C, 463, 465 D, 465 E, 472, 485, 570 P

PO-1050
(5/69)

UNITED STATES PATENT OFFICE
CERTIFICATE OF CORRECTION

Patent No. 3,663,527            Dated May 16, 1972

Inventor(s) Gert Hegar

It is certified that error appears in the above-identified patent and that said Letters Patent are hereby corrected as shown below:

Column 1, line 5, "Ciba Limited" should be

--- CIBA-GEIGY AG ---

Signed and sealed this 2nd day of April 1974.

(SEAL)
Attest:

EDWARD M. FLETCHER, JR.            C. MARSHALL DANN
Attesting Officer            Commissioner of Patents